(12) United States Patent
Lee et al.

(10) Patent No.: US 11,679,583 B2
(45) Date of Patent: Jun. 20, 2023

(54) METHOD OF MANUFACTURING DISPLAY UNIT

(71) Applicant: SHANJIN OPTOELECTRONICS (SUZHOU) CO., LTD., Zhangjiagang (CN)

(72) Inventors: Beom Seok Lee, Daejeon (KR); Hang Suk Choi, Daejeon (KR); Eung Jin Jang, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 377 days.

(21) Appl. No.: 16/758,701

(22) PCT Filed: Mar. 13, 2019

(86) PCT No.: PCT/KR2019/002925
§ 371 (c)(1),
(2) Date: Apr. 23, 2020

(87) PCT Pub. No.: WO2019/177379
PCT Pub. Date: Sep. 19, 2019

(65) Prior Publication Data
US 2021/0178742 A1      Jun. 17, 2021

(30) Foreign Application Priority Data

Mar. 16, 2018   (KR) .................. 10-2018-0031080

(51) Int. Cl.
*B32B 38/18*   (2006.01)
*B32B 38/00*   (2006.01)
(Continued)

(52) U.S. Cl.
CPC ........ *B32B 38/185* (2013.01); *B32B 38/0004* (2013.01); *B32B 38/1808* (2013.01);
(Continued)

(58) Field of Classification Search
CPC . B32B 38/185; B32B 38/0004; B32B 38/105; B32B 2307/42; B32B 2457/20;
(Continued)

(56) References Cited

U.S. PATENT DOCUMENTS

| 2008/0068720 | A1  | 3/2008 | Shigemura et al. |
| 2014/0138646 | A1  | 5/2014 | Lee et al. |
| 2015/0246520 | A1* | 9/2015 | Kim ........................ B32B 37/18 156/60 |

FOREIGN PATENT DOCUMENTS

| JP | 09189916 A      | 7/1997 |
| JP | 2002023151 A    | 1/2002 |
| JP | 2005266284 A *  | 9/2005 |
| JP | 2008070760 A    | 3/2008 |

(Continued)

*Primary Examiner* — Carson Gross
(74) *Attorney, Agent, or Firm* — Schmeiser, Olsen & Watts, LLP

(57) ABSTRACT

A method of manufacturing a display unit including: preparing an optical film; forming a first alignment mark on the optical film; forming a cut-out line, corresponding to a predetermined closed curve layout, on the optical film based on a position of the first alignment mark; preparing a panel having a second alignment mark; aligning the optical film and the panel based on the positions of the first alignment mark and the second alignment mark; and laminating the optical film, after the processing of forming the cut-out line, on the panel.

9 Claims, 8 Drawing Sheets

(51) Int. Cl.
*G02B 1/14* (2015.01)
*G02B 5/30* (2006.01)
*B29C 63/00* (2006.01)
*B32B 43/00* (2006.01)

(52) U.S. Cl.
CPC .. *B32B 38/1841* (2013.01); *B29C 2063/0008* (2013.01); *B32B 43/003* (2013.01); *B32B 2307/42* (2013.01); *B32B 2457/206* (2013.01); *G02B 1/14* (2015.01); *G02B 5/30* (2013.01)

(58) Field of Classification Search
CPC ........ B32B 2457/202; B32B 2457/206; B32B 38/1833; B32B 38/1841
See application file for complete search history.

(56) References Cited

FOREIGN PATENT DOCUMENTS

| | | | | |
|---|---|---|---|---|
| JP | 2011085632 | A | 4/2011 | |
| JP | 2014194513 | A | 10/2014 | |
| JP | 2017090602 | A | 5/2017 | |
| JP | 2017-151410 | A | 8/2017 | |
| JP | 2017-151475 | A | 8/2017 | |
| KR | 10-2008-0048669 | A | 6/2008 | |
| KR | 10-2010-0013932 | A | 2/2010 | |
| KR | 10-2011-0130064 | A | 12/2011 | |
| KR | 10-2014-0140017 | A | 12/2014 | |
| WO | WO-2007108244 | A1 * | 9/2007 | ........... G02B 5/3033 |
| WO | 2008102866 | A1 | 8/2008 | |
| WO | 2011155036 | A1 | 12/2011 | |
| WO | 2013129256 | A1 | 9/2013 | |
| WO | 2014024867 | A1 | 2/2014 | |

\* cited by examiner

[Figure 1A]
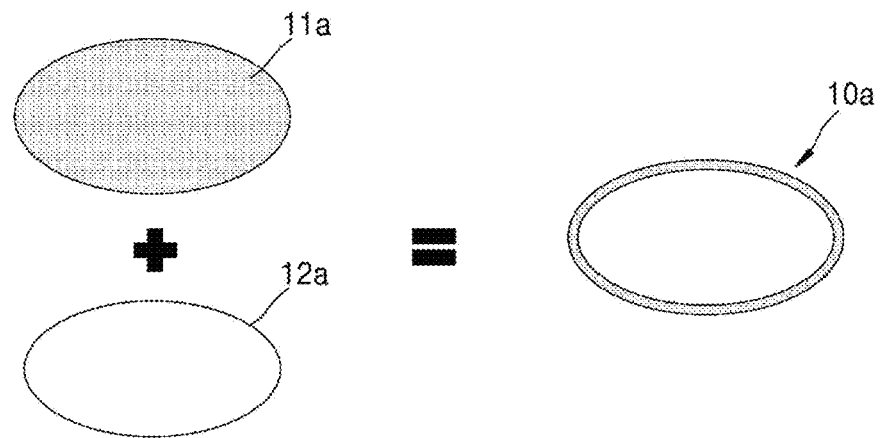
[Figure 1B]
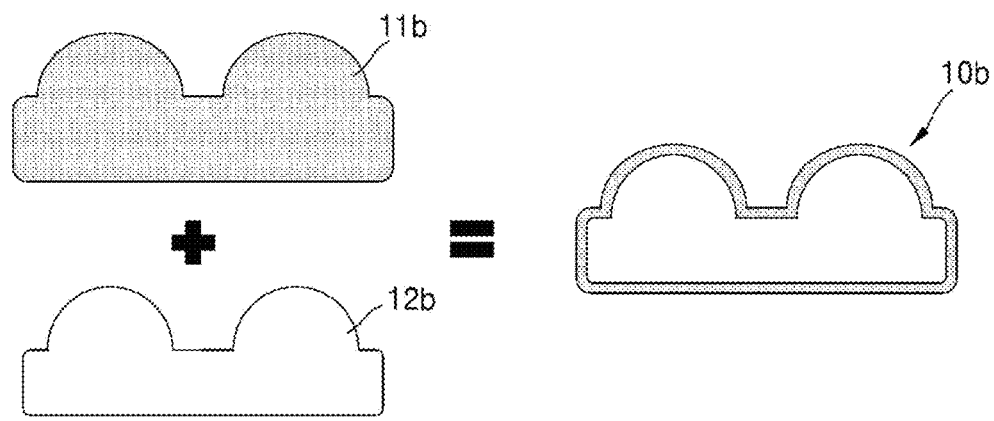

[Figure 2A]
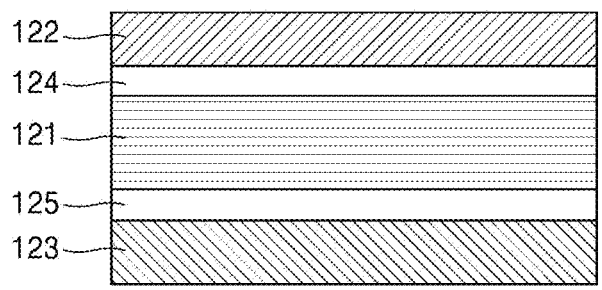
[Figure 2B]
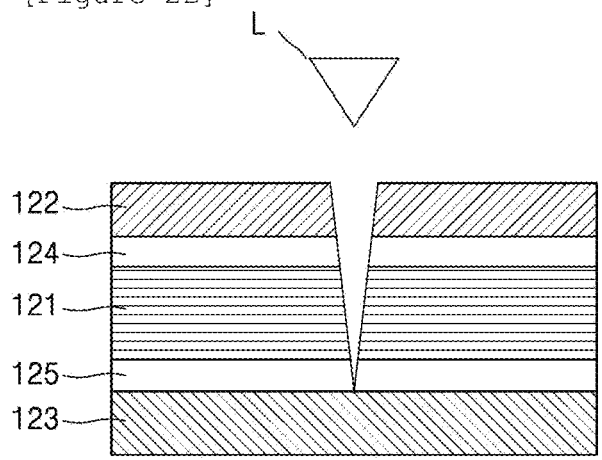

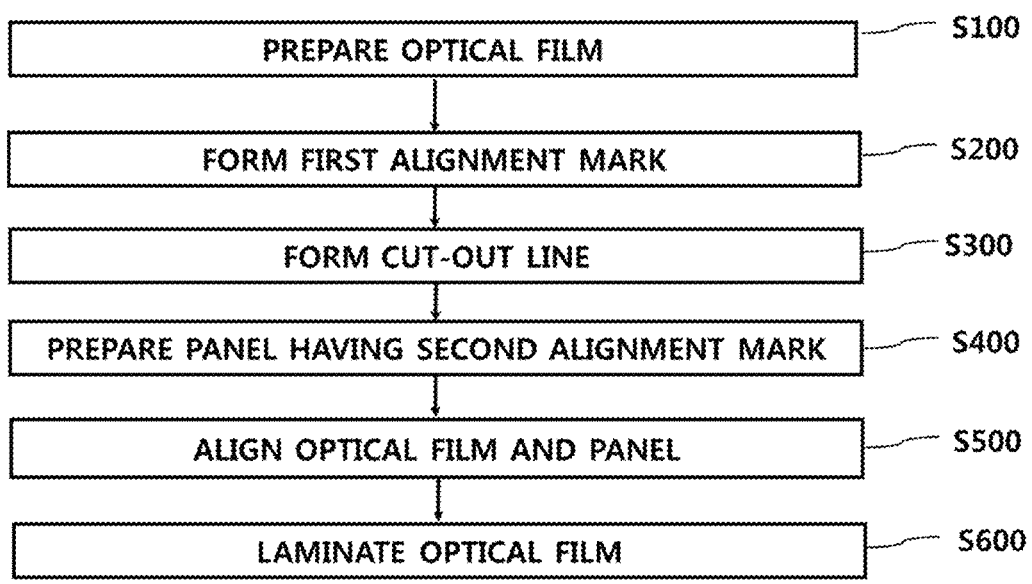
[Figure 3]

[Figure 4A]
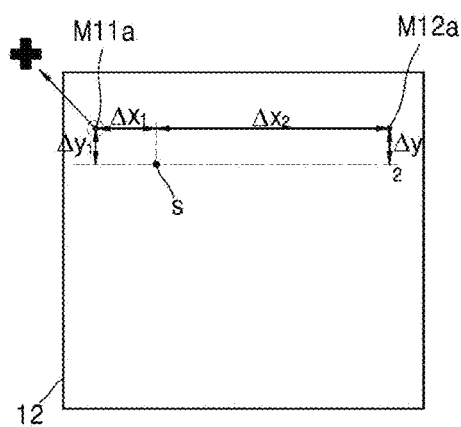
[Figure 4B]
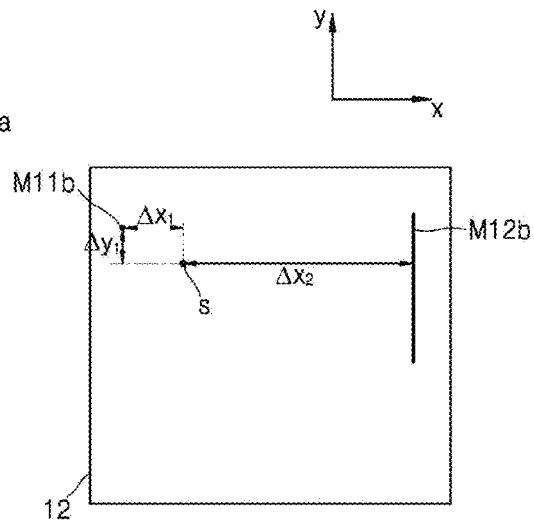
[Figure 4C]
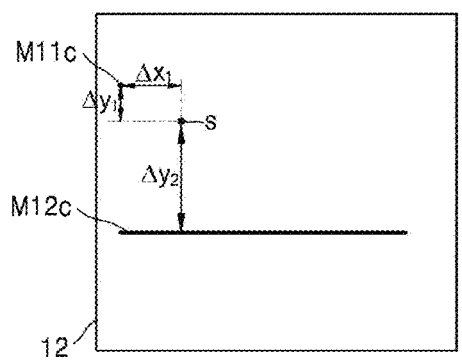
[Figure 4D]
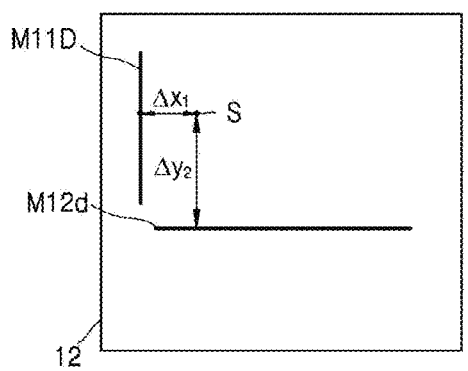

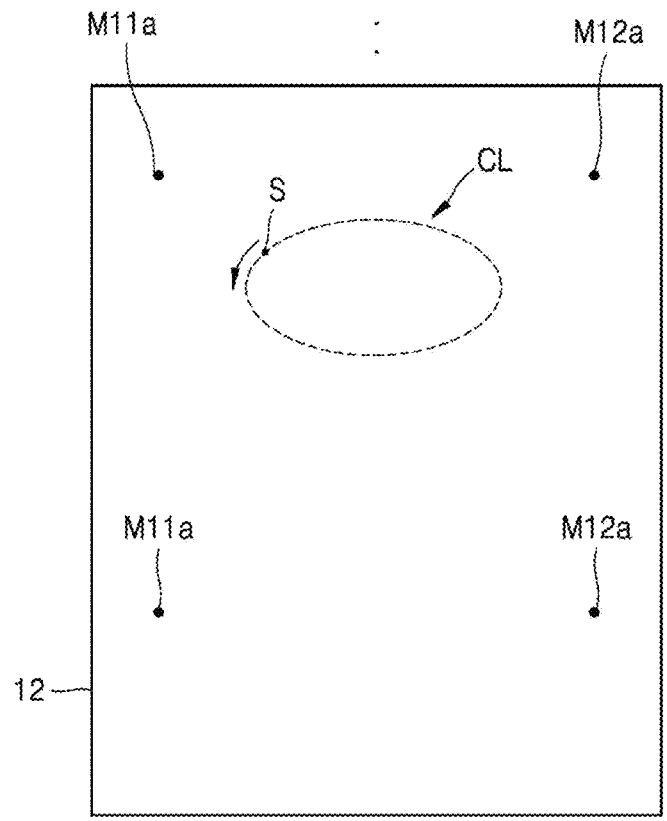
[Figure 5]

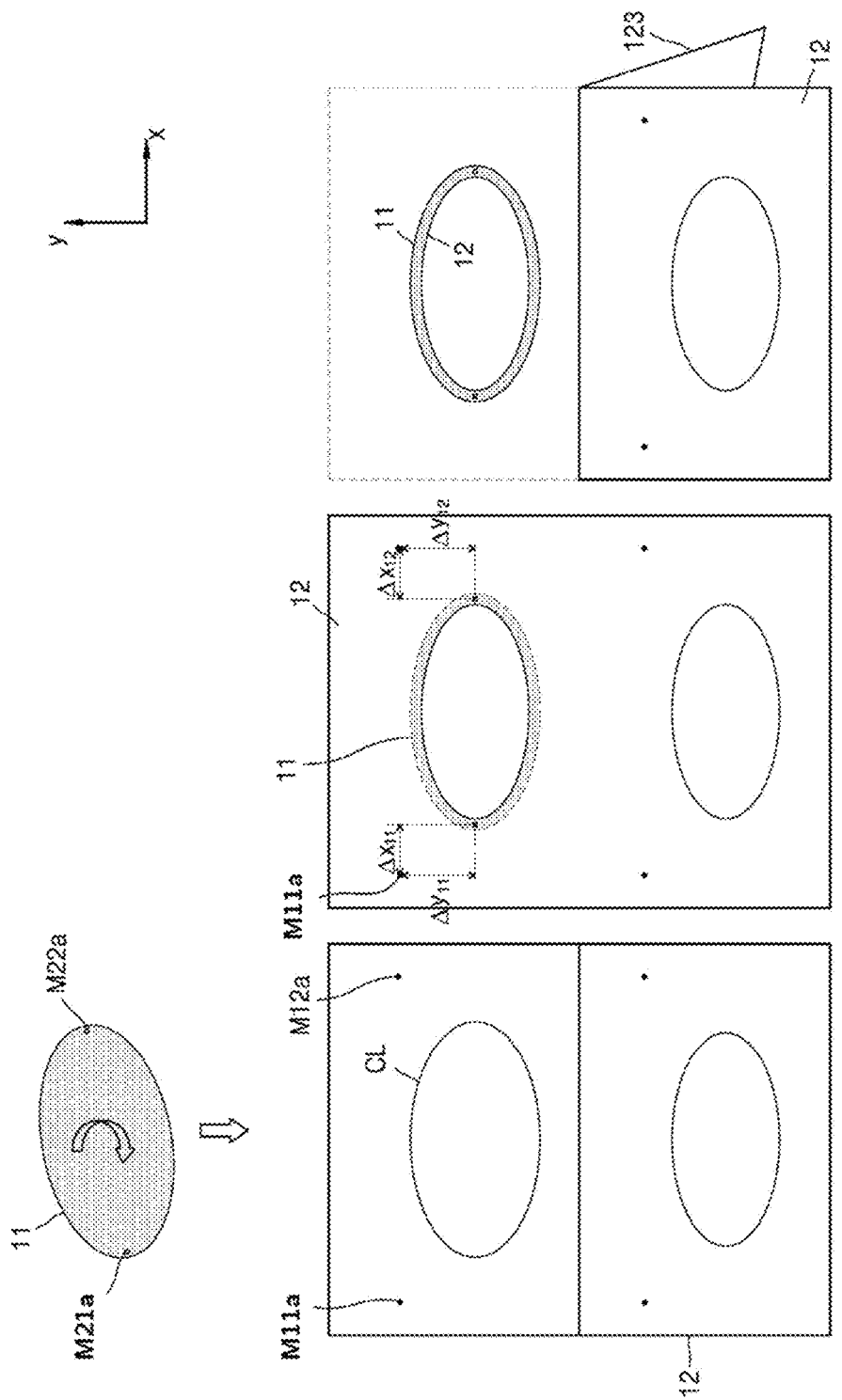

[Figure 7]
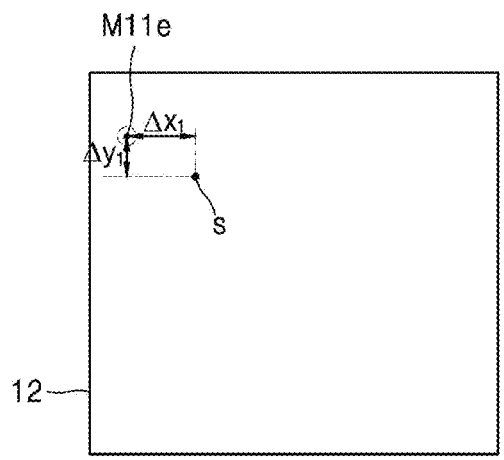
[Figure 8]
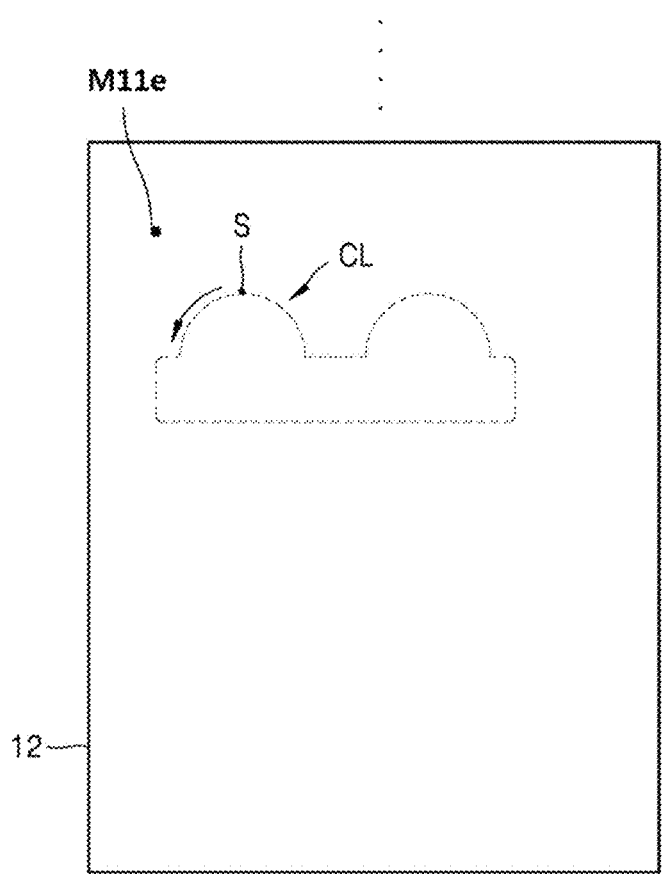

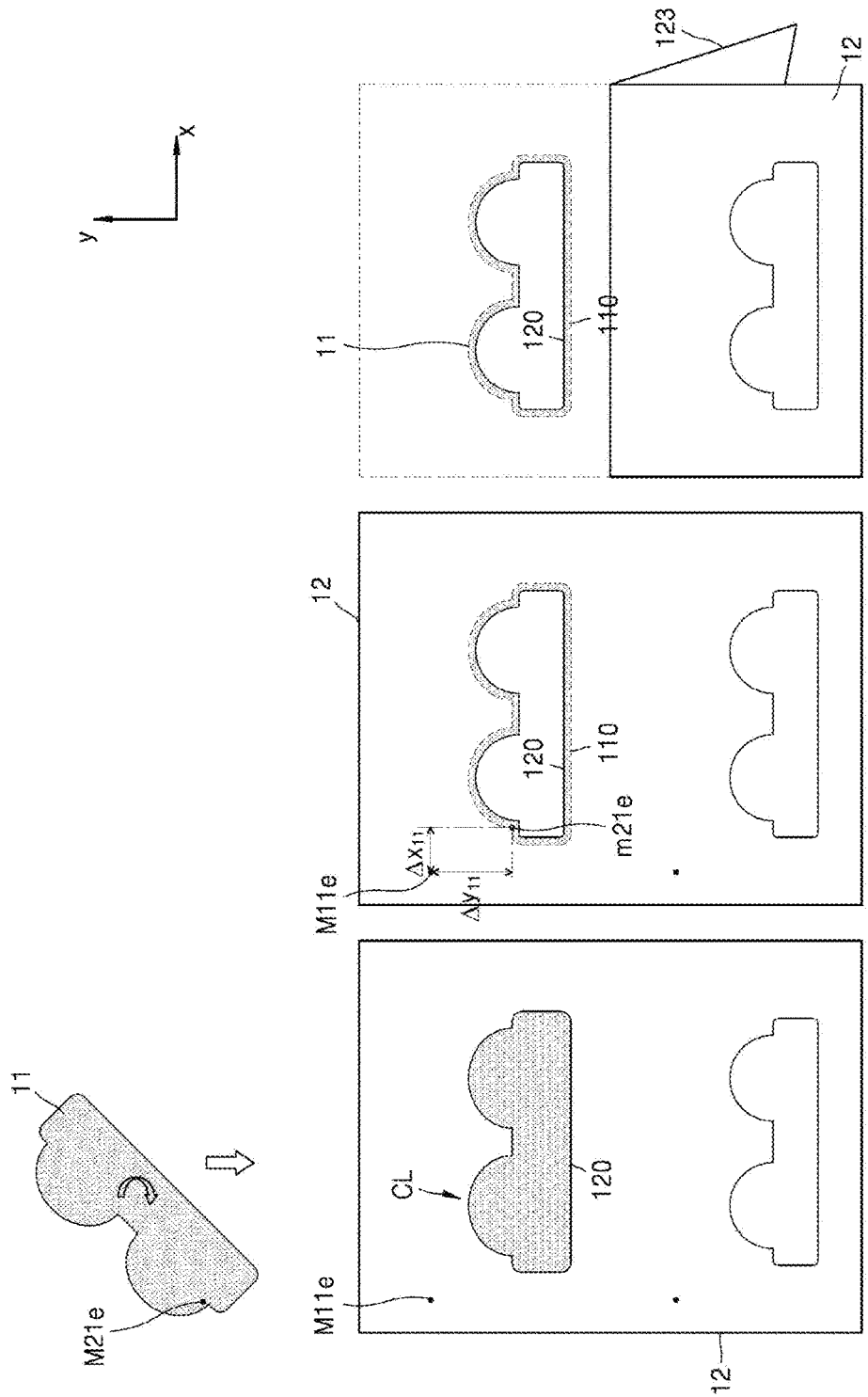

METHOD OF MANUFACTURING DISPLAY UNIT

CROSS-REFERENCE TO RELATED APPLICATIONS

This application is the U.S. national stage of international Application No. PCT/KR2019/002925, filed Mar. 13, 2019, and claims priority from Korean patent Application No. KR10-2018-0031080, filed with the Korean Intellectual Property Office on Mar. 16, 2018, the contents of which are incorporated in their entirety as if fully set forth herein.

TECHNICAL FIELD

The present invention relates to a method of manufacturing a display unit, which manufactures a display unit by laminating a film on a panel.

BACKGROUND

A display unit may be manufactured by attaching an optical film including a polarizer onto a surface of a panel. A liquid crystal panel having a liquid crystal layer or an organic EL panel having an OLED layer may be used as the panel.

In general, a layout of the panel used for the display unit may be quadrangular, particularly, rectangular.

Meanwhile, an optical film having a quadrangular layout corresponding to the quadrangular layout of the panel is attached to the panel having the quadrangular layout.

In this case, a process of aligning positions of the panel and the optical film is required so that the layout of the panel and the layout of the optical film correspond to each other before the panel and the optical film are attached to each other. Since both of the layout of the panel and the layout of the optical film are quadrangular, it is possible to align the panel and/or the optical film so that a positional relationship between two or more two vertices of an optical film and an alignment mark provided on the panel or a vertex of the panel coincides with a predetermined positional relationship, even though the optical film having no separate alignment mark is used.

However, the above-mentioned alignment method may not be proper because, recently, the display unit sometimes has a layout which is not simply quadrangular or rectangular but includes a non-linear line.

The above-mentioned background art is technical information that the inventors have retained to derive exemplary embodiments of the present invention or have obtained in the course of deriving the exemplary embodiments of the present invention, and cannot be thus said to be technical information publicly known to the public before filing the invention.

SUMMARY

Exemplary embodiments of the present invention provide a method of manufacturing a display unit, the method capable of aligning a panel and an optical film, which each have a layout including a non-linear line, and laminating the optical film on the panel.

A method of manufacturing a display unit according to an exemplary embodiment of the present invention includes: preparing an optical film; forming a first alignment mark on the optical film; forming a cut-out line, corresponding to a predetermined closed curve layout, on the optical film based on a position of the first alignment mark; preparing a panel having a second alignment mark; aligning one of the optical film and the panel with the other of the optical film and the panel based on the positions of the first alignment mark and the second alignment mark; and laminating the optical film, after the processing of forming the cut-out line, on the panel.

In the exemplary embodiment of the present invention, the optical film may have a polarizing film, a surface protective film disposed at one side of the polarizing film, and a carrier film disposed at the other side of the polarizing film.

In the exemplary embodiment of the present invention, the cut-out line may be formed by cutting the surface protective film and the polarizing film without cutting the carrier film.

In the exemplary embodiment of the present invention, the first alignment mark may be formed on any one of the surface protective film and the carrier film.

In the exemplary embodiment of the present invention, the first alignment mark may be formed on the carrier film.

In the exemplary embodiment of the present invention, the laminating may be performed after separating the carrier film from the optical film after the processing.

In the exemplary embodiment of the present invention, a layout of the panel and the cut-out line each may include a non-linear line.

In the exemplary embodiment of the present invention, the layout of the panel and the cut-out line each may have only the non-linear line.

In the exemplary embodiment of the present invention, the forming of the first alignment mark may form two or more first alignment marks.

In the exemplary embodiment of the present invention, an interior surrounded by the cut-out line may not include the first alignment mark.

The method of manufacturing a display unit according to the exemplary embodiments of the present invention forms the first alignment mark on the optical film and then forms the cut-out line, which corresponds to the predetermined closed curve layout, on the optical film based on the first alignment mark, such that the cut-out line may be formed at the predetermined position with respect to the first alignment mark on the optical film, and the panel and a region of the optical film, which is specified by the cut-out line and is to be laminated, may be aligned with each other based on the first alignment mark and the second alignment mark, and as a result, it is possible to easily align the panel, which has the layout including the non-linear line before the laminating, and the optical film after the processing of forming the cut-out line.

BRIEF DESCRIPTION OF DRAWINGS

FIGS. 1A and 1B are schematic top plan views illustrating a panel, an optical film, and a display unit according to an exemplary embodiment of the present invention.

FIGS. 2A and 2B are schematic cross-sectional views illustrating a lamination structure of the optical film used for a method of manufacturing a display unit according to the exemplary embodiment of the present invention.

FIG. 3 is a block diagram explaining a process flow of the method of manufacturing a display unit according to the exemplary embodiment of the present invention.

FIGS. 4A to 4D are schematic views illustrating several examples of forming first alignment marks on the optical films according to the exemplary embodiment of the present invention.

FIG. 5 is a schematic view illustrating an exemplary process of forming a cut-out line on the optical film according to the exemplary embodiment of the present invention.

FIGS. 6A to 6C are schematic views of an exemplary process of aligning the optical film and the panel and laminating the optical film on the panel according to the exemplary embodiment of the present invention.

FIG. 7 is a schematic view illustrating an exemplary process of forming a first alignment mark on an optical film according to another exemplary embodiment of the present invention.

FIG. 8 is a schematic view illustrating an exemplary process of forming a cut-out line on the optical film according to another exemplary embodiment of the present invention.

FIGS. 9A to 9C are schematic views explaining an exemplary process of aligning the optical film and the panel and laminating the optical film on the panel according to another exemplary embodiment of the present invention.

DESCRIPTION OF MAIN REFERENCE
NUMERALS OF DRAWINGS

10a, 10b: Display unit
11, 11a, 11b: Panel
12, 12a, 12b: Optical film
121: Polarizing film
122: Surface protective film
123: Carrier film
CL: Cut-out line
M11a, M12a, M11b, M12b, M11c, M12c, M11d, M12d: First alignment mark
M21a, M22a: Second alignment mark

DETAILED DESCRIPTION

The present invention will be apparent with reference to exemplary embodiments to be described below in detail together with the accompanying drawings. However, the present invention is not limited to the exemplary embodiments disclosed herein but will be implemented in various forms. The exemplary embodiments are provided so that the present invention is completely disclosed, and a person with ordinary skill in the art can fully understand the scope of the present invention. The present invention will be defined only by the scope of the appended claims. Meanwhile, the terms used in the present specification are for explaining the exemplary embodiments, not for limiting the present invention. Unless particularly stated otherwise in the present specification, a singular form also includes a plural form. The terms such as "comprises (includes)" and/or "comprising (including)" used in the specification do not exclude presence or addition of one or more other constituent elements, steps, operations, and/or elements, in addition to the mentioned constituent elements, steps, operations, and/or elements. The terms such as "first" and "second" may be used to describe various constituent elements, but the constituent elements should not be limited by the terms. These terms are used only to distinguish one constituent element from another constituent element.

Hereinafter, the present invention will be described in detail with reference to the accompanying drawings.

FIGS. 1A and 1B are schematic top plan views illustrating a panel, an optical film, and a display unit according to an exemplary embodiment of the present invention, and FIGS. 2A and 2B are schematic cross-sectional views illustrating a lamination structure of the optical film used for a method of manufacturing a display unit according to the exemplary embodiment of the present invention.

Display units 10a and 10b may have structures in which optical films 12a and 12b are laminated on panels 11a and 11b.

Each of the panels 11a and 11b may be, but not limited to, a liquid crystal panel having a liquid crystal layer or an organic EL panel having an OLED layer.

In a case in which the liquid crystal panel is used as an example of each of the panels 11a and 11b, each of the optical films 12a and 12b to be described below may be laminated on both surfaces of each of the panels 11a and 11b. In a case in which the organic EL panel is used as another example of each of the panels 11a and 11b, each of the optical films 12a and 12b to be described below may be laminated on only one surface of each of the panels 11a and 11b.

Meanwhile, each of the display units 10a and 10b according to the exemplary embodiment of the present invention may have a layout including a non-linear line. In the present specification, the feature "the layout including the non-linear line" means that the layout does not include only a combination of rectilinear sections, but also includes a curved section or includes only the curved section. For example, the display unit 10a has a layout having only a non-linear line, as illustrated in FIG. 1A. The display units 10b has a layout including both a rectilinear line and a non-linear line, as illustrated in FIG. 1B. In this case, in order to manufacture the display units 10a and 10b as illustrated in FIGS. 1A and 1B, each of the panels 11a and 11b needs to have a layout including a non-linear line, and each of the optical films 12a and 12b, which are processed by cutting or the like, needs to have a layout including a non-linear line.

The optical film 12 may include a polarizing film 121, a surface protective film 122 disposed at one side of the polarizing film, and a carrier film 123 disposed at the other side of the polarizing film 121.

The polarizing film 121 may include a polarizing plate on which an absorption axis is oriented in a predetermined direction. Further, support bases (not illustrated) for supporting the polarizing plates may be disposed on upper and lower portions of the polarizing plates, respectively.

The surface protective film 122 is disposed, together with an adhesive layer 124, at one side opposite to a side at which the polarizing film 121 is laminated to face the panel, and the surface protective film 122 may protect one surface of the polarizing film 121 from damage caused by external impact or the like.

The carrier film 123 may be disposed at the other side of the polarizing film 121 where the adhesive layer 125 interposed, such that the polarizing film 121 may be laminated on the panel. The carrier film 123 may be separated from the other side of the polarizing film 121 before the polarizing film 121 is laminated on the panel.

Meanwhile, according to the method of manufacturing a display unit, the optical film 12 may be supplied in a way that an optical film raw sheet, which is elongated in a longitudinal direction thereof, is unwound from an optical film roll (not illustrated) around which the optical film raw sheet is wound. The optical film 12 needs to be cut out to have a layout corresponding to the single panel. As a cutting method used in this case, instead of a full-cutting method of fully cutting the surface protective film 122, the polarizing film 121, and the carrier film 123, a half-cutting method may be used, which cuts into the surface protective film 122 to cut the polarizing film 121 but leaves the carrier film 123 connected before and after a cutting line C.

Because the method of manufacturing a display unit according to the exemplary embodiment of the present invention needs to cut out the optical film so that the optical film corresponds to the layout of the panel including the non-linear line, a laser cutting unit L, which easily enables non-linear movement cutting, may be used as a cutting means, instead of a circular blade cutting unit suitable for linear movement cutting.

FIG. 3 is a block diagram for explaining a process flow of the method of manufacturing a display unit according to the exemplary embodiment of the present invention, FIGS. 4A to 4D are schematic views illustrating several examples of forming first alignment marks on the optical films according to the exemplary embodiment of the present invention, FIG. 5 is a schematic view illustrating an example of forming a cut-out line on the optical film according to the exemplary embodiment of the present invention, and FIGS. 6A to 6C are schematic views for explaining an example of a process of aligning the optical film and the panel and laminating the optical film on the panel according to the exemplary embodiment of the present invention.

The method of manufacturing a display unit according to the exemplary embodiment of the present invention may include preparing an optical film (S100), forming a first alignment mark (S200), forming a cut-out line (S300), preparing a panel having a second alignment mark (S400), aligning the optical film and the panel (S500), and laminating the optical film (S600).

The preparing of the optical film (S100) prepares the optical film 12 used for the method of manufacturing a display unit, and as described above, the optical film 12 may be structured to have the polarizing film 121, the surface protective film 122 disposed at one side of the polarizing film 121, and the carrier film 123 disposed at the other side of the polarizing film 121.

The forming of the first alignment mark (S200) forms the first alignment mark on the optical film, and the first alignment marks M11 and M12, which are formed by the forming of the first alignment mark, may be used as a reference for determining a start position of a cut-out line, which will be described below, and a reference for determining a positional relationship with the second alignment mark to be described below. The first alignment mark may be formed as a cross-shaped mark or a rectilinear mark elongated in one direction by a marking device (not illustrated). Here, the first alignment mark may be formed on any one of the surface protective film 122 and the carrier film 123. More particularly, the first alignment mark may be formed on the carrier film 123. Since the carrier film 123 is separated from the polarizing film 121 when laminating the polarizing film 121 on a panel 11, there is an advantage in that it may not be necessary to perform a separate process of removing the first alignment marks M11 and M12 from the manufactured display unit.

Meanwhile, in a case in which the shape of the display unit to be manufactured has only the non-linear line, as illustrated in FIG. 1A, the layout of the panel 11 and a cut-out line CL have only non-linear lines, and in this case, the two or more first alignment marks M11 and M12 may be formed in the forming of the first alignment mark. This is because all the cut-out lines, which are formed by subsequent cutting, are non-linear lines and have no rectilinear section, such that it is difficult to use the rectilinear section of the cut-out line as reference information associated with alignment.

As the first alignment marks, two or more cross-shaped marks M11a and M12a may be formed as illustrated in FIG. 4A, one or more cross-shaped marks M11b and M11c and one or more rectilinear marks M12b and M12c may be formed as illustrated in FIGS. 4B and 4C, or two or more rectilinear marks M11d and M12d disposed to be perpendicular to each other may be formed as illustrated in FIG. 4D.

The forming of the cut-out line (S300) may form the cut-out line, which corresponds to a predetermined closed curve layout, on the optical film based on the position of the first alignment mark. Here, the predetermined closed curve layout may be a layout that corresponds to the layout including the non-linear line required to manufacture the display unit having the layout including the non-linear line. Further, in order to form the cut-out line, the closed curve layout including the non-linear line may have a smaller size than a closed curve layout including the non-linear line of the panel.

Here, a cutting-out start position S for forming the cut-out line may be determined based on the position of the first alignment mark which is detected and calculated by an imaging device (not illustrated). For example, as illustrated in FIGS. 4A, 4B, 4C, and 4D, positions, which are spaced apart from positions of the first alignment marks M11a, M12a, M11b, M12b, M11c, M12c, M11d, and M12d at predetermined distances $\Delta x_1$, $\Delta x_2$, $\Delta y_1$, and $\Delta y_2$ in an x-axis direction and/or a y-axis direction (based on FIGS. 4A to 4D), may be determined as the cutting-out start positions S.

Hereinafter, as an example, the subsequent processes will be described with reference to the optical film 12 having the first alignment marks M11a and M12a illustrated in FIG. 4A.

The forming of the cut-out line (S300) may form the cut-out line CL through the half-cutting method by using a laser cutting unit (not illustrated) depending on the cutting-out start position S determined based on the positions of the first alignment marks M11a and M12a. The interior, which is surrounded by the cut-out line CL formed in this manner, may not include the first alignment marks M11a and M12a.

The preparing of the panel having the second alignment mark (S400) may prepare the panel 11 having second alignment marks M21a and M22a which may be compared, in terms of positions, with the first alignment marks M11a and M12a. Here, like the first alignment marks, each of the second alignment marks M21a and M22a may be formed as a cross-shaped mark, a rectilinear mark, or the like.

The aligning of the optical film and the panel (S500) may align one of the optical film and the panel with the other of the optical film and the panel based on the positions of the first alignment marks and the second alignment marks.

For the preferable alignment between the optical film and the panel, a positional relationship between the first alignment mark and the second alignment mark may be predetermined. For example, as illustrated in FIG. 6B, the predetermined positional relationship may be determined based on information in which a left group of the first alignment mark M11a and the second alignment mark M21a need to be spaced apart from each other by $\Delta x_{11}$ in the x-axis direction and spaced apart from each other by $\Delta y_{11}$ in the y-axis direction, and based on information in which a right group of the first alignment mark M12a and the second alignment mark M22a need to be spaced apart from each other by $\Delta x_{12}$ in the x-axis direction and spaced apart from each other by $\Delta y_{12}$ in the y-axis direction.

In a case in which the positional relationship between the optical film and the panel is determined as illustrated in FIG. 6A before the optical film 12 is laminated on the panel 11, the optical film 12 and the panel 11 may be aligned, as illustrated in FIG. 6B, as at least one of the optical film 12 and the panel 11 is rotated and translationally moved based on a plan view so that the first alignment marks M11$a$ and M12$a$ and the second alignment marks M21$a$ and M22$a$ have the predetermined positional relationship based on the information about the positions of the first alignment marks M11$a$ and M12$a$ and the second alignment marks M21$a$ and M22$a$ which are detected, calculated, and derived by the imaging device (not illustrated).

Thereafter, the laminating of the optical film (S600) may laminate the optical film 12, after the processing of forming the cut-out line CL, on the panel 11. The laminating may be performed by using a laminating device (not illustrated) after separating the carrier film 123 from the optical film 12 after the processing, as illustrated in FIG. 6C.

FIG. 7 is a schematic view illustrating an example of forming a first alignment mark on an optical film according to another exemplary embodiment of the present invention, FIG. 8 is a schematic view illustrating an example of forming a cut-out line on the optical film according to another exemplary embodiment of the present invention, and FIGS. 9A to 9C are schematic views for explaining an example of a process of aligning the optical film and the panel and laminating the optical film on the panel according to another exemplary embodiment of the present invention.

Because most configurations and effects of another exemplary embodiment of the present invention are identical to those of the above-mentioned exemplary embodiment, the description thereof will focus on the differences.

As illustrated in FIG. 1B, the display unit according to another exemplary embodiment of the present invention may have a layout including a combination of a non-linear line and a rectilinear line, and in this case, each of the panel 11 and the cut-out line CL may also have a layout including a combination of a non-linear line and a rectilinear line.

In another exemplary embodiment, the forming of the first alignment mark (S200) may form only one first alignment mark M11$e$ for alignment, as illustrated in FIG. 7.

In the forming of the cut-out line (S300), the cutting-out start position S for forming the cut-out line may be determined based on the position of the first alignment mark which is detected and calculated by the imaging device (not illustrated). For example, as illustrated in FIG. 8, positions, which are spaced apart from the position of the first alignment mark M11$e$ at predetermined distances $\Delta x_1$ and $\Delta y_1$ in the x-axis direction and/or the y-axis direction (based on FIG. 8), may be determined as the cutting-out start positions S.

The forming of the cut-out line (S300) may form the cut-out line CL through the half-cutting method by using the laser cutting unit (not illustrated) depending on the cutting-out start position S determined based on the position of the first alignment mark M11$e$. The interior, which is surrounded by the cut-out line CL formed in this manner, may not include the first alignment mark M11$e$.

The preparing of the panel having the second alignment mark (S400) may prepare the panel 11 having a second alignment mark M21$e$ which may be compared, in terms of a position, with the first alignment mark M11$e$. Here, like the first alignment mark M11$e$, the only one second alignment mark M21$e$ may be provided.

The aligning of the optical film and the panel (S500) may align one of the optical film and the panel with the other of the optical film and the panel based on the positions of the first alignment mark and the second alignment mark. For this alignment, a second rectilinear section 120, which corresponds to a first rectilinear section 110 of the layout of the panel 10 and a first rectilinear section 110 of the layout of the cut-out line CL, may be additionally used.

For the preferable alignment between the optical film and the panel, a positional relationship between the first alignment mark and the second alignment mark may be predetermined, and a positional relationship between the first rectilinear section and the second rectilinear section may also be predetermined. For example, as illustrated in FIG. 9B, the predetermined positional relationships may be determined based on information in which a group of the first alignment mark M11$e$ and the second alignment mark M21$e$ need to be spaced apart from each other by $\Delta x_{11}$ in the x-axis direction and spaced apart from each other by $\Delta y_{11}$ in the y-axis direction, and based on information in which a group of the first rectilinear section 110 and the second rectilinear section 120 need to be parallel to each other.

In a case in which the positional relationship between the optical film and the panel is determined as illustrated in FIG. 9A before the optical film 12 is laminated on the panel 11, the optical film 12 and the panel 11 may be aligned, as illustrated in FIG. 9B, as at least one of the optical film 12 and the panel 11 is rotated and translationally moved based on a plan view so that the first alignment mark M11$e$ and the second alignment mark M21$e$ may have the predetermined positional relationship based on the information about the positions of the first alignment mark M11$e$ and the second alignment mark M21$e$ which are detected, calculated, and derived by the imaging device (not illustrated).

Thereafter, the laminating of the optical film (S600) may laminate the optical film 12, after the processing of forming the cut-out line CL, on the panel 11. The laminating may be performed by using the laminating device (not illustrated) after separating the carrier film 123 from the optical film 12 after the processing, as illustrated in FIG. 9C.

The method of manufacturing a display unit according to the exemplary embodiments of the present invention forms the first alignment mark on the optical film and then forms the cut-out line, which corresponds to the predetermined closed curve layout, on the optical film based on the first alignment mark, such that the cut-out line is formed at the predetermined position with respect to the first alignment mark on the optical film, and the panel and a region of the optical film, which is specified by the cut-out line and is to be laminated, may be aligned with each other based on the first alignment mark and the second alignment mark, and as a result, there is an advantage in that it is possible to easily align the panel, which has the layout including the non-linear line before the laminating, and the optical film after the processing of forming the cut-out line.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

The invention claimed is:

1. A method of manufacturing a display unit, the method comprising:
   preparing an optical film, wherein the optical film comprises a polarizing film, a surface protective film disposed side on an opposite surface of the polarizing film, and a carrier film disposed on an opposite surface of the polarizing film;

forming a first alignment mark on the optical film;

laser cutting a cut-out line on the optical film based on a position of the first alignment mark, wherein the cut-out line corresponds to a predetermined closed curve layout and wherein an area of the optical film surrounded by the cut-out line does not include the first alignment mark; wherein the cut-out line is formed by laser cutting the surface protective film and the polarizing film without cutting the carrier film;

preparing a panel having a second alignment mark, wherein the panel comprises a second closed curve layout which corresponds to the predetermined closed curve layout of the optical film, the predetermined closed curve layout having a smaller size than the second closed curve layout, aligning the optical film and the panel by aligning the positions of the first alignment mark of the optical film and the second alignment mark of the panel such that the predetermined closed curve layout fits within the second closed curve layout due to the smaller size; and laminating the optical film, after forming the cut-out line, on the panel.

2. The method of claim 1, wherein the first alignment mark is formed on any one of the surface protective film and the carrier film.

3. The method of claim 2, wherein the first alignment mark is formed on the carrier film.

4. The method of claim 3, wherein the laminating is performed after separating the carrier film from the optical film after forming the cut-out line.

5. The method of claim 1, wherein a layout of the panel and the cut-out line each includes a non-linear line.

6. The method of claim 5, wherein the layout of the panel and the cut-out line each have only the non-linear line.

7. The method of claim 6, wherein the first alignment mark comprises two or more alignment marks.

8. The method of claim 5, wherein the layout of the panel and the cut-out line each comprises the non-linear line and at least one rectilinear line.

9. The method of claim 1, wherein the laser cutting begins at a start position disposed within a perimeter of the optical film and ends at a ending position disposed within the perimeter.

* * * * *